(12) United States Patent
Lee et al.

(10) Patent No.: US 8,329,264 B2
(45) Date of Patent: Dec. 11, 2012

(54) LIQUID CRYSTAL ALIGNMENT AGENT, AND LIQUID CRYSTAL ALIGNMENT FILM AND LIQUID CRYSTAL DISPLAY INCLUDING SAME

(75) Inventors: Bum-Jin Lee, Uiwang-si (KR); Won-Seok Dong, Uiwang-si (KR); Mi-Ra Im, Uiwang-si (KR); Dong-Seon Uh, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 635 days.

(21) Appl. No.: 12/543,533

(22) Filed: Aug. 19, 2009

(65) Prior Publication Data

US 2010/0136264 A1 Jun. 3, 2010

(30) Foreign Application Priority Data

Dec. 2, 2008 (KR) .................. 10-2008-0121478

(51) Int. Cl.
*C09K 19/00* (2006.01)
(52) U.S. Cl. ........ 428/1.26; 428/1.1; 428/1.2; 428/1.25; 252/299.4; 525/422
(58) Field of Classification Search .................... 428/1.1, 428/1.2, 1.25, 1.26, 1.53; 252/299.4; 549/557; 524/114, 555, 558; 525/422; 526/312, 321; 560/44, 65
See application file for complete search history.

(56) References Cited

U.S. PATENT DOCUMENTS 5,276,132 A 1/1994 Nishikawa et al.
5,420,233 A 5/1995 Isogai et al.

FOREIGN PATENT DOCUMENTS

| CN | 1648726 A | 8/2005 |
|---|---|---|
| CN | 1661428 A | 8/2005 |
| CN | 1712491 A | 12/2005 |
| CN | 101210184 A | 7/2008 |
| JP | 06-136122 | 5/1994 |
| JP | 11-084391 | 3/1999 |
| JP | 2008-181102 | 8/2008 |
| KR | 10-1993-700873 | 3/1993 |

OTHER PUBLICATIONS

English machine translation of JP 2008181102, Mar. 2012.*

* cited by examiner

*Primary Examiner* — Angela Ortiz
*Assistant Examiner* — Ruiyun Zhang
(74) *Attorney, Agent, or Firm* — Summa, Additon & Ashe, P.A.

(57) ABSTRACT

Disclosed are a liquid crystal alignment agent, and a liquid crystal alignment film and a liquid crystal display (LCD) including the same. The liquid crystal alignment agent includes a polymer of polyamic acid, a polyimide, or a combination thereof, and an epoxy compound represented by the following Chemical Formula 1.

[Chemical Formula 1]

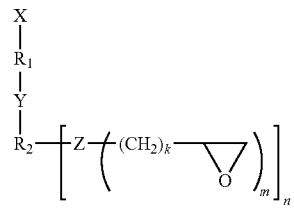

In the above Chemical Formula 1, each substituent is the same as defined in the specification.

10 Claims, No Drawings

LIQUID CRYSTAL ALIGNMENT AGENT, AND LIQUID CRYSTAL ALIGNMENT FILM AND LIQUID CRYSTAL DISPLAY INCLUDING SAME

CROSS-REFERENCE TO RELATED APPLICATION

This application claims priority to and the benefit of Korean Patent Application No. 10-2008-0121478 filed in the Korean Intellectual Property Office on Dec. 2, 2008, the entire disclosure of which is incorporated herein by reference.

FIELD OF THE INVENTION

The present invention relates to a liquid crystal alignment agent and a liquid crystal alignment film, and a liquid crystal display (LCD) including the same.

BACKGROUND OF THE INVENTION

Generally, a liquid crystal display can be fabricated by coating a liquid crystal alignment agent on a glass substrate deposited with a transparent indium tin oxide (ITO) conductive layer, heating it to form a liquid crystal alignment film, then combining two substrates oppositely facing each other, and implanting liquid crystals therebetween. Alternatively, a liquid crystal display can be fabricated by dripping liquid crystals on one substrate and combining the substrate with another substrate oppositely facing the one substrate. The latter method is typically used in the production of $5^{th}$ generation, or later, LCDs for medium- and large-sized product lines.

A polyimide resin can be used in a liquid crystal alignment film. Polyimide resin typically used for a liquid crystal alignment film can be prepared by condensing and polymerizing aromatic acid dianhydrides such as pyromellitic acid dianhydride (PMDA), biphthalic acid dianhydride (BPDA), and the like, and aromatic diamines such as para-phenylene diamine (p-PDA), meta-phenylene diamine (m-PDA), 4,4-methylene dianiline (MDA), 2,2-bisamino phenylhexafluoropropane (HFDA), meta-bisaminophenoxy diphenylsulfone (m-BAPS), para-bisaminophenoxy diphenylsulfone (p-BAPS), 4,4-bis[(aminophenoxy)phenyl]propane (BAPP), 4,4-bisaminophenoxyphenyl hexafluoropropane (HF-BAPP), and the like.

A polyimide resin for a liquid crystal alignment film that includes only aromatic acid dianhydride and diamine can provide thermal stability, chemical resistance, mechanical properties, and the like, but can also have problems such as transparency and dissolvability deterioration due to a charge transfer complex and electro-optical characteristic deterioration. Japanese Patent Laid-Open Publication No. Pyeung 11-84391 discloses a method of solving the problem by including an aliphatic cyclic acid dianhydride monomer or an aliphatic cyclic diamine in a polyimide resin for a liquid crystal alignment film. In addition, Japanese Patent Laid-Open Publication No. Pyeung 06-136122 discloses a method of introducing a functional diamine with a side chain or a functional acid dianhydride with a side chain in order to increase pretilt angle and safety of liquid crystals. In addition, U.S. Pat. No. 5,420,233 discloses development of a vertical alignment layer in a vertical alignment (VA) mode, in which liquid crystals are vertically aligned from the surface to form an LCD panel.

However, as the LCD market has recently increased, high quality LCDs are increasingly required. In addition, since LCDs are rapidly becoming larger, there is an increasing requirement for a highly productive liquid crystal alignment film. Accordingly, a liquid crystal alignment film having a low inferiority rate in the LCD manufacturing process, excellent electro-optical characteristics, high reliability, and high performance that widely satisfies different characteristics for various developing LCDs is constantly required.

SUMMARY OF THE INVENTION

An exemplary embodiment of the present invention provides a liquid crystal alignment agent that easily controls a pretilt angle, has excellent liquid crystal orientation, and exhibits excellent chemical resistance against a cleaning solvent used in the LCD panel manufacturing process.

Another embodiment of the present invention provides a liquid crystal alignment film including the liquid crystal alignment agent.

Yet another embodiment of the present invention provides a liquid crystal display (LCD) including the liquid crystal alignment film.

The embodiments of the present invention are not limited to the above technical purposes, and a person of ordinary skill in the art can understand other technical purposes.

According to one embodiment of the present invention, a liquid crystal alignment agent is provided, which includes a polymer of polyamic acid, polyimide, or a combination thereof, and an epoxy compound represented by the following Chemical Formula 1.

[Chemical Formula 1]

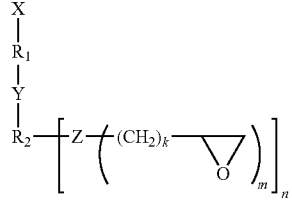

In the above Chemical Formula 1:

X is unsubstituted C1 to C20 linear or branched alkyl, unsubstituted C3 to C30 cycloalkyl, C1 to C20 linear or branched alkyl substituted with at least one halogen or C3 to C30 cycloalkyl substituted with at least one halogen;

Y is a single bond, O, COO, CONH, or OCO;

Z is N or O;

$R_1$ and $R_2$ are the same or different, and are independently a single bond, substituted or unsubstituted aryl, substituted or unsubstituted cycloalkyl, substituted or unsubstituted cycloalkenyl, or a fused ring of at least two of the above, provided that at least one of $R_1$ and $R_2$ is substituted or unsubstituted aryl, substituted or unsubstituted cycloalkyl, substituted or unsubstituted cycloalkenyl, or a fused ring of at least two of the above;

k is an integer ranging from 1 to 5;

m is an integer of 1 or 2; and n is an integer of 1 or more.

Another embodiment of the present invention provides a liquid crystal alignment film prepared by coating the liquid crystal alignment agent on a substrate.

Another embodiment of the present invention provides a liquid crystal display (LCD) including the liquid crystal alignment film.

The liquid crystal alignment agent has excellent vertical alignment, can easily control a pretilt angle, and can have excellent chemical resistance, and can thereby provide a liquid crystal alignment film having excellent resistance in a cleaning process. Accordingly, the present invention can provide LCD products having high display quality. The alignment layer therein may have no liquid crystal deterioration in the LCD panel manufacturing process and in other various processes such as cleaning and the like.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, unless a specific definition is otherwise provided, the term "alkyl" refers to a C1-C30 alkyl, the term "cycloalkyl" refers to a C3-C30 cycloalkyl, the term "alkenyl" refers to a C2-C30 alkenyl, the term "cycloalkenyl" refers to a C3-C30 cycloalkenyl, the term "aryl" refers to a C6-C30 aryl, the term "heteroaryl" refers to a C2-C30 heteroaryl including 1 to 20 heteroatoms, for example 1 to 15 heteroatoms, and as another example 1 to 5 heteroatoms, which heteroatoms can be selected from N, O, S, Si, and combinations thereof, and the term "halogen" refers to F, Cl, Br, or I.

As used herein, unless a specific definition is otherwise provided, the term "substituted" refers to one substituted with at least one functional group such as halogen (F, Cl, Br, or I), hydroxy, nitro, cyano, amino (—$NH_2$, —NH(R), —N(R''')(R''''), (where R''' and R'''' are each independently C1 to C10 alkyl), amidino, hydrazine, hydrazone, carboxyl, substituted or unsubstituted alkyl, substituted or unsubstituted cycloalkyl, substituted or unsubstituted alkenyl, substituted or unsubstituted cycloalkenyl, substituted or unsubstituted aryl, substituted or unsubstituted cycloalkyl, substituted or unsubstituted heteroaryl, or a combination thereof.

The liquid crystal alignment agent according to one embodiment of the present invention includes a polymer of polyamic acid, polyimide, or a combination thereof; and an epoxy compound represented by the following Chemical Formula 1.

cycloalkenyl, or fused ring of at least two of the above, provided that at least one of $R_1$ and $R_2$ is substituted or unsubstituted aryl, substituted or unsubstituted cycloalkyl, substituted or unsubstituted cycloalkenyl, or a fused ring of at least two of the above;

k is an integer ranging from 1 to 5;

m is an integer of 1 or 2; and n is an integer of 1 or more.

According to the embodiment of the present invention, the liquid crystal alignment agent can have excellent vertical alignment, can easily control a pretilt angle, and can have chemical resistance, and can thereby provide a liquid crystal alignment film having excellent resistance in the cleaning process. Furthermore, it can provide an LCD product having high display quality, but no liquid crystal deterioration in the LCD panel manufacturing process and no alignment layer characteristic deterioration in various processes such as cleaning and the like.

According to the embodiment of the present invention, polyamic acid is copolymerized by including an aliphatic cyclic acid dianhydride and/or an aromatic acid dianhydride and selectively including an aromatic diamine and/or siloxane diamine. Then, a liquid crystal alignment agent is prepared by adding the above epoxy compound to the prepared polyamic acid and/or polyimide.

The polyamic acid prepared by copolymerizing the acid dianhydride and diamine compound may be prepared using any conventional method for copolymerization of a polyamic acid, without any limitation. In addition, methods for preparing polyamic acid and polyimide are well-known to those of ordinary skill in the art and the skilled artisan can provide a polyamic acid and/or polyimide without under experimentation, and therefore such methods do not need to be illustrated in further detail.

The polyamic acid can have a number average molecular weight ranging from about 10,000 to about 500,000 g/mol. When it is imidized, it has a glass transition temperature ranging from about 200 to about 350° C. depending on imidization ratio or structure.

In addition, the polyamic acid can include a repeating unit represented by the following Chemical Formula 2.

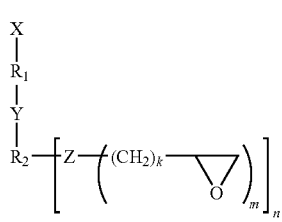

[Chemical Formula 1]

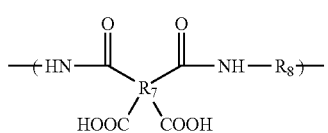

[Chemical Formula 2]

In the above Chemical Formula 1:

X is unsubstituted C1 to C20 linear or branched alkyl, unsubstituted C3 to C30 cycloalkyl, C1 to C20 linear or branched alkyl substituted with at least one halogen or C3 to C30 cycloalkyl substituted with at least one halogen;

Y is a single bond, O, COO, CONH, or OCO;

Z is N or O;

$R_1$ and $R_2$ are the same or different, and are independently a single bond, substituted or unsubstituted aryl, substituted or unsubstituted cycloalkyl, substituted or unsubstituted In the above Chemical Formula 2:

$R_7$ is a quadrivalent organic group derived from an aliphatic cyclic acid dianhydride or an aromatic acid dianhydride; and $R_8$ is a divalent organic group derived from an aromatic diamine or siloxane diamine.

The polyimide may include a repeating unit represented by the following Chemical Formula 3.

[Chemical Formula 3]

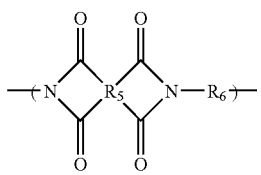

In the above Chemical Formula 3:

$R_5$ is a quadrivalent organic group derived from an aliphatic cyclic acid dianhydride or aromatic acid dianhydride; and $R_6$ is a divalent organic group derived from an aromatic diamine or siloxane diamine.

In the present invention, the polymer can be prepared by including only one of the aromatic acid dianhydride and the aliphatic cyclic acid dianhydride, or both of them in a predetermined ratio.

The aromatic acid dianhydride can withstand a rubbing process applied to introduce alignment of liquid crystals in one direction in about a 0.1 μm-thick liquid crystal alignment film, can maintain heat resistance in a manufacturing process at a high temperature of about 200° C. or more, and can provide excellent chemical resistance.

Non-limiting examples of the aromatic acid dianhydride include pyromellitic acid dianhydride (PMDA), biphthalic acid dianhydride (BPDA), oxydiphthalic acid dianhydride (ODPA), benzophenone tetracarboxylic acid dianhydride (BTDA), hexafluoroisopropylidene diphthalic acid dianhydride (6-FDA), and the like, and combinations thereof.

The aliphatic cyclic acid dianhydride can overcome problems such as non-dissolvability in a common organic solvent, low transmission in a visible ray region due to a charge transfer complex, and electro-optical characteristic deterioration due to structurally high polarity.

Non-limiting examples of the aliphatic cyclic acid dianhydride include 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclobutane tetracarboxylic acid dianhydride (CBDA), 1,2,3,4-cyclopentane tetracarboxylic acid dianhydride (CPDA), 1,2,4,5-cyclohexane tetracarboxylic acid dianhydride (CHDA), and the like, and combinations thereof.

The aromatic diamine and the siloxane diamine can be used singularly or in combination in a predetermined ratio to prepare the polymer.

Non-limiting examples of the aromatic diamine used for preparation of the polymer include para-phenylenediamine (p-PDA), 4,4-methylene dianiline (MDA), 4,4-oxydianiline (ODA), meta-bisaminophenoxy diphenylsulfone (m-BAPS), para-bisaminophenoxy diphenylsulfone (p-BAPS), 2,2-bis[(aminophenoxy)phenyl]propane (BAPP), 2,2-bisaminophenoxy phenyl hexafluoropropane (HF-BAPP), and the like, and combinations thereof.

Examples of the aromatic diamine may include functional diamine represented by the following Chemical Formulae 4 to 7.

[Chemical Formula 4]

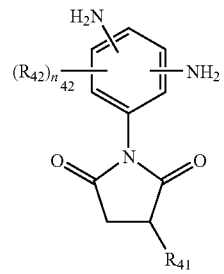

In the above Chemical Formula 4, $R_{41}$ is hydrogen, substituted or unsubstituted C1 to C20 alkyl, substituted or unsubstituted C6 to C30 aryl, or substituted or unsubstituted C2 to C30 heteroaryl, $R_{42}$ is substituted or unsubstituted C1 to C20 alkyl, substituted or unsubstituted C6 to C30 aryl, substituted or unsubstituted C2 to C30 heteroaryl, substituted or unsubstituted C3 to C30 cycloalkyl, substituted or unsubstituted C3 to C30 cycloalkenyl, or a fused ring of at least two of the above, and $n_{42}$ is an integer ranging from 0 to 3.

[Chemical Formula 5]

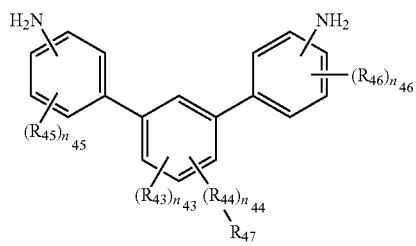

In the above Chemical Formula 5:

$R_{43}$, $R_{45}$, and $R_{46}$ are independently substituted or unsubstituted C1 to C20 alkyl, substituted or unsubstituted C6 to C30 aryl, or substituted or unsubstituted C2 to C30 heteroaryl;

$R_{44}$ is O, COO, CONH, OCO, or substituted or unsubstituted C1 to C10 alkylene;

$R_{47}$ is hydrogen, substituted or unsubstituted C1 to C20 alkyl, substituted or unsubstituted C6 to C30 aryl, substituted or unsubstituted C2 to C30 heteroaryl, substituted or unsubstituted C3 to C30 cycloalkyl, substituted or unsubstituted C3 to C30 cycloalkenyl, a fused ring of at least two of the above, or alkyl, aryl, heteroaryl, cycloalkyl, or cycloalkenyl including at least one of —O—, —COO—, —CONH—, —OCO—, or a combination thereof, $n_{43}$ is an integer of 0 to 3;

$n_{45}$ and $n_{46}$ are independently integers ranging from 0 to 4; and $n_{44}$ is an integer of 0 or 1.

[Chemical Formula 6]

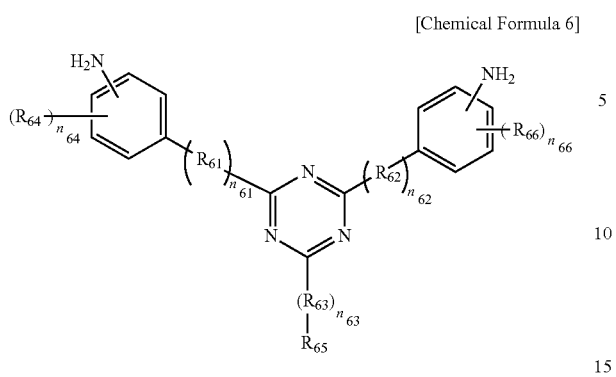

In the above Chemical Formula 6:

$R_{64}$ and $R_{66}$ are independently substituted or unsubstituted C1 to C20 alkyl, substituted or unsubstituted C6 to C30 aryl, substituted or unsubstituted C2 to C30 heteroaryl, substituted or unsubstituted C3 to C30 cycloalkyl, substituted or unsubstituted C3 to C30 cycloalkenyl, or a fused ring of at least two of the above;

$R_{65}$ is hydrogen, substituted or unsubstituted C1 to C20 alkyl, substituted or unsubstituted C6 to C30 aryl, substituted or unsubstituted C2 to C30 heteroaryl, substituted or unsubstituted C3 to C30 cycloalkyl, substituted or unsubstituted C3 to C30 cycloalkenyl, or a fused ring of at least two of the above;

$R_{61}$ and $R_{62}$ are independently O or COO;

$R_{63}$ is O, COO, CONH, or OCO;

$n_{64}$ and $n_{66}$ are independently integers ranging from 0 to 4; and $n_{61}$, $n_{62}$ and $n_{63}$ are independently integers of 0 or 1.

[Chemical Formula 7]

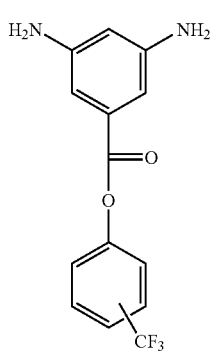

In the above Chemical Formula 7:

$R_{51}$ is a single bond, O, COO, OCO, NHCO, or CONH;

$n_{51}$ is an integer ranging from 0 to 2; and $R_{52}$ is substituted or unsubstituted C1 to C20 alkyl, substituted or unsubstituted C6 to C30 aryl, substituted or unsubstituted C2 to C30 heteroaryl, substituted or unsubstituted C3 to C30 cycloalkyl, substituted or unsubstituted C3 to C30 cycloalkenyl, a fused ring of at least two of the above, or alkyl, aryl, heteroaryl, cycloalkyl or cycloalkenyl including —O—, —COO—, —CONH—, —OCO—, or a combination thereof.

Examples of the functional diamine represented by Chemical Formula 7 may be represented by the following Chemical Formulae 8 to 10.

[Chemical Formula 8]

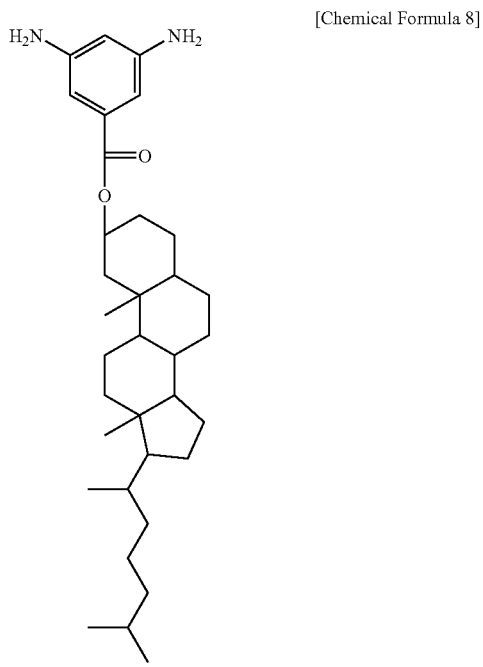

[Chemical Formula 9]

[Chemical Formula 10]

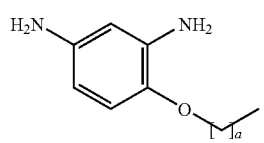

In the above Chemical Formula 10, a is an integer ranging from 10 to 30.

In addition, examples of $R_{42}$, $R_{47}$, $R_{65}$, and $R_{52}$ represented by the above Chemical Formulae 4 to 7 may include androsteryl, cholesteryl, dehydro epiandrosteryl, epiandrosteryl, ergosteryl, estryl, 11α-hydroxymethylsteryl, 11α-progesteryl, lanosteryl, mestranyl, methyl testosteryl, norethisteryl, pregnenolonyl, β-sitosteryl, stigmasteryl, testosteryl, and the like.

The siloxane diamine may have a structure represented by the following Chemical Formula 11 as follows.

[Chemical Formula 11]

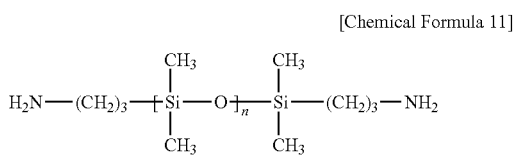

In the above Chemical Formula 11, n is an integer ranging from 1 to 10.

Examples of a new epoxy compound of the above Chemical Formula 1 are represented in the following Chemical Formula 12 to 14 and are provided as exemplary embodiments, but are not limited thereto.

[Chemical Formula 12]

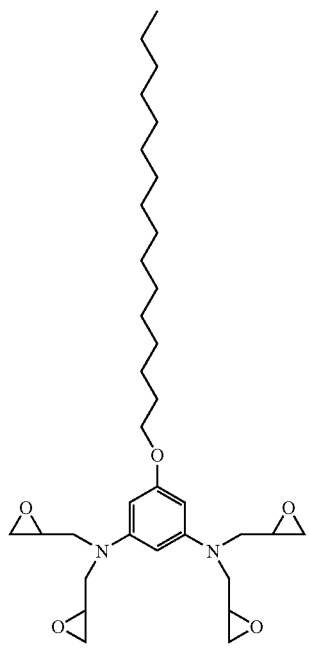

[Chemical Formula 13]

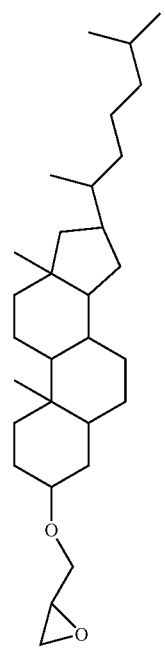

[Chemical Formula 14]

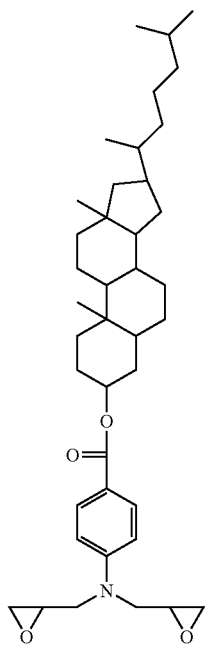

The new epoxy compound is mixed with a polymer as an additive to the polymer, but it does not react therewith at room temperature. However, when it is printed to form a thin film on an ITO substrate and heated to fabricate a LCD panel, it reacts with reaction sites such as amic acid and an amine group or the like at the main chain of the polymer and cures the polymer. In addition, since an epoxy compound used as a hardener includes a side chain as shown in the above Chemical Formula 1, the cured liquid crystal alignment film plays a role of forming a tilt angle from the surface of the liquid crystals when the liquid crystals are injected into a liquid crystal panel. It is different from the conventional art in which a diamine or acid dianhydride including a steroid structure and the like to form the pretilt angle of liquid crystals is copolymerized during the polyimide polymerization, and an epoxy compound including no side chain as shown in Chemical Formula 1 is added thereto to prepare a liquid crystal alignment film.

In addition, the new epoxy compound makes it possible to freely regulate the pretilt angle of liquid crystal molecules in a small amount and simultaneously plays a role of a hardener, to thereby improve chemical resistance and reliability of an alignment layer.

According to one embodiment of the present invention, the liquid crystal alignment agent may include the new epoxy compound in an amount of about 0.01 to about 60 parts by weight based on about 100 parts by weight of the polymer. In another embodiment, the new epoxy compound may be included in an amount of about 0.5 to about 40 parts by weight or in an amount of about 1 to about 20 parts by weight to easily regulate the pretilt angle and secure excellent alignment. In other words, the new epoxy compound is included in various amounts to control the pretilt angle, and can provide a liquid crystal alignment agent that is capable of realizing IPS, TN, and VA modes depending on display modes.

According to another embodiment of the present invention, a liquid crystal alignment film fabricated by coating the liquid crystal alignment agent on a substrate is provided.

In the present invention, the liquid crystal alignment agent including polyamic acid and an epoxy compound is dissolved in a solvent, and the solution is coated on a substrate. The coated substrate is entirely or partially imidized to fabricate a liquid crystal alignment film.

In addition, the polyamic acid is partially or entirely imidized to prepare a soluble polyimide. Then, to prepare a liquid crystal alignment film, the polyimide is used alone, or the polyamic acid and soluble polyimide can be used together.

The following examples illustrate the present invention in more detail. These examples, however, should not in any sense be interpreted as limiting the scope of the present invention.

EXAMPLE 1

1 mol of 4,4-methylene dianiline is put in a four-necked flask having an agitator, a temperature controller, a nitrogen gas-injecting device, and a cooler, and nitrogen is passed through. Then, N-methyl-2-pyrrolidone (NMP) is dissolved therein. Next, 0.5 mol of 5-(2,5-dioxotetrahydrofuryl)-3-methylcyclohexane-1,2-dicarboxylic acidanhydride (DOCDA) in a solid form and 0.5 mol of pyromellitic acid dianhydride (PMDA) are added thereto. The resulting mixture is strongly agitated. NMP is added so as to obtain a solid amount of 15 wt %. Then, the temperature of the mixture is maintained at 25° C. or less and reacted for 24 hours, preparing a polyamic acid solution. When the polymerization is complete, NMP and 2-butylcellusolve (2-BC) in a ratio of 8:2 are added to 15 wt % of the polyamic acid solution to dilute it to a concentration of 5 wt %. Then, a liquid crystal alignment agent is prepared by adding 1 part by weight of an epoxy compound represented by the following Chemical Formula 14 to 100 parts by weight of the solid polyamic acid.

[Chemical Formula 14]

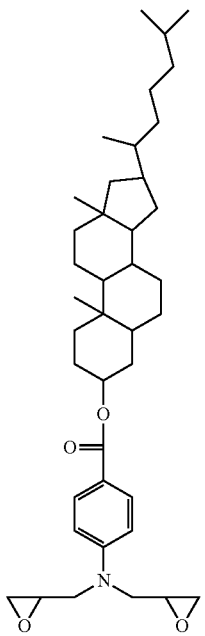

EXAMPLE 2

A polyamic acid solution is prepared according to the same method as Example 1 except for adding 2 parts by weight of an epoxy compound represented by the above Chemical Formula 14 based on 100 parts by weight of the solid polyamic acid.

EXAMPLE 3

A polyamic acid solution is prepared according to the same method as Example 1 except for adding 5 parts by weight of an epoxy compound represented by the above Chemical Formula 14 based on 100 parts by weight of the solid polyamic acid.

EXAMPLE 4

A polyamic acid solution is prepared according to the same method as Example 1 except for adding 10 parts by weight of an epoxy compound represented by the above Chemical Formula 14 based on 100 parts by weight of the solid polyamic acid.

EXAMPLE 5

A polyamic acid solution is prepared according to the same method as Example 1 except for adding 20 parts by weight of an epoxy compound represented by the above Chemical Formula 14 based on 100 parts by weight of the solid polyamic acid.

EXAMPLE 6

1 mol of 4,4-methylene dianiline is put in a four-necked flask having an agitator, a temperature controller, a nitrogen gas-injecting device, and a cooler, and nitrogen is passed therethrough, and N-methyl-2-pyrrolidone (NMP) is dissolved therein. Next, 1 mol of 5-(2,5-dioxotetrahydrofuryl)-3-methylcyclohexane-1,2-dicarboxylic acidanhydride (DOCDA) solid is added to the above product. The resulting product is strongly agitated. NMP is added so as to obtain a solid amount of 15 wt %. Then, the temperature of the mixture is maintained at 25° C. or less and reacted for 24 hours, preparing a polyamic acid solution. When the polyamic acid polymerization is complete, 1 mol of pyridine and 1 mol of acetic acid dianhydride are added thereto. The resulting product is heated in a reactor to 80° C. Then, the reactor is maintained for 6 hours to perform polymerization. After the polymerization, the polyimide solution is precipitated in methanol. The precipitated solid is filtrated and then dried at 40° C. in a vacuum atmosphere for 24 hours. The dried polyimide powder is diluted to a concentration of 5 wt % by adding the mixture of NMP and 2-BC in a ratio of 8:2, and an epoxy compound represented by the above Chemical Formula 14 is added thereto in an amount of 1 part by weight based on 100 parts by weight of the polyimide solid, preparing a polyimide solution.

EXAMPLE 7

A polyimide solution is prepared according to the same method as Example 6 except for including 2 parts by weight of an epoxy compound represented by the above Chemical Formula 14 based on 100 parts by weight of the polyimide solid.

EXAMPLE 8

A polyimide solution is prepared according to the same method as Example 6 except for including 5 parts by weight of an epoxy compound represented by the above Chemical Formula 14 based on 100 parts by weight of the polyimide solid.

EXAMPLE 9

A polyimide solution is prepared according to the same method as Example 6 except for including 10 parts by weight of an epoxy compound represented by the above Chemical Formula 14 based on 100 parts by weight of the polyimide solid.

EXAMPLE 10

A polyimide solution is prepared according to the same method as Example 6 except for including 20 parts by weight of an epoxy compound represented by the above Chemical Formula 14 based on 100 parts by weight of the polyimide solid.

EXAMPLE 11

A polyamic acid solution is prepared according to the same method as Example 1 except for using 0.05 mol of a functional diamine having a side chain represented by the Chemical Formula 8 and 0.95 mol of 4,4-methylene dianiline instead of 1 mol of 4,4-methylene dianiline.

EXAMPLE 12

A polyamic acid solution is prepared according to the same method as Example 6 except for using 0.05 mol of a functional diamine having a side chain represented by the Chemical Formula 8 and 0.95 mol of 4,4-methylene dianiline instead of 1 mol of 4,4-methylene dianiline.

COMPARATIVE EXAMPLE 1

A polyamic acid solution is prepared according to the same method as Example 1 except that it did not include an epoxy compound represented by the above Chemical Formula 14.

COMPARATIVE EXAMPLE 2

A polyamic acid solution is prepared according to the same method as Example 6 except that it did not include an epoxy compound represented by the above Chemical Formula 14.

COMPARATIVE EXAMPLE 3

A polyamic acid solution is prepared according to the same method as Example 11 except that it did not include an epoxy compound represented by the above Chemical Formula 14.

COMPARATIVE EXAMPLE 4

A polyamic acid solution is prepared according to the same method as Example 12 except that it did not include an epoxy compound represented by the above Chemical Formula 14.

COMPARATIVE EXAMPLE 5

A polyamic acid solution is prepared according to the same method as Example 1 except for using bisphenol A diglycidyl ether instead of an epoxy compound represented by the above Chemical Formula 14.

COMPARATIVE EXAMPLE 6

A polyamic acid solution is prepared according to the same method as Example 6 except for using bisphenol A diglycidyl ether instead of an epoxy compound represented by the above Chemical Formula 14.

The liquid crystal alignment agents prepared according to the aforementioned methods are prepared by coating the polyamic acid solution on a 0.1 μm-thick ITO glass substrate and curing it at 210° C. in order to measure pretilt angle of liquid crystal molecules due to rubbing. The liquid crystal alignment film is coated on an ITO glass substrate, and then evaluated for printability by observing spreading and end-rolling characteristics through the naked eye and an optical microscope. On the other hand, the surface of the liquid crystal alignment film can be rubbed with a rubbing machine. In this instance, the two substrates are arranged in parallel to each other in an opposite rubbing direction to have a 50 μm-long cell gap. Then, the substrates are united to form a cell. The liquid crystal cell is filled with liquid crystals, and then pretilt angle is measured using a crystal rotation method. The results are provided in Table 1.

TABLE 1

| Sample | Polymer | Epoxy Compound (parts by weight) | Pretilt angle (°) | Printability |
|---|---|---|---|---|
| Example 1 | polyamic acid | 1 | 15 | Good |
| Example 2 | polyamic acid | 2 | 77 | Good |
| Example 3 | polyamic acid | 5 | 80 | Good |
| Example 4 | polyamic acid | 10 | >89 | Good |
| Example 5 | polyamic acid | 20 | >89 | Good |
| Example 6 | polyimide | 1 | 22 | Good |
| Example 7 | polyimide | 2 | 85 | Good |
| Example 8 | polyimide | 5 | 89 | Good |
| Example 9 | polyimide | 10 | >89 | Good |
| Example 10 | polyimide | 20 | >89 | Good |
| Example 11 | functional polyamic acid | 1 | 83 | Good |
| Example 12 | functional polyimide | 1 | >89 | Good |
| Comparative Example 1 | polyamic acid | — | 0.8 | Good |
| Comparative Example 2 | polyimide | — | 1.2 | Good |
| Comparative Example 3 | functional polyamic acid | — | 47 | Good |
| Comparative Example 4 | functional polyimide | — | 68 | Good |
| Comparative Example 5 | polyamic acid | cross-linking agent | 0.7 | Good |
| Comparative Example 6 | polyimide | cross-linking agent | 0.9 | Good |

As shown in Table 1, the liquid crystal alignment agents of Examples 1 to 12 can realize a pretilt angle in all ranges, as well as good printability, compared with those of Comparative Examples 1 to 6.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal alignment agent comprising
a polymer of polyamic acid, a polyimide, or a combination thereof, and
an epoxy compound represented by the following Chemical Formula 1:

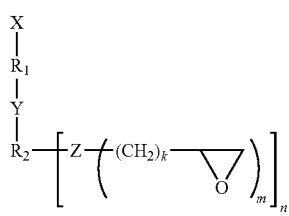

[Chemical Formula 1]

wherein, in the above Chemical Formula 1,

X is unsubstituted C1 to C20 linear or branched alkyl, unsubstituted C3 to C30 cycloalkyl, C1 to C20 linear or branched alkyl substituted with at least one halogen or C3 to C30 cycloalkyl substituted with at least one halogen, Y is a single bond, O, COO, CONH, or OCO;

Z is N or O;

$R_1$ and $R_2$ are the same or different, and are independently a single bond, substituted or unsubstituted aryl, substituted or unsubstituted cycloalkyl, substituted or unsubstituted cycloalkenyl, or a fused ring of at least two of the above, provided that at least one of $R_1$ and $R_2$ is substituted or unsubstituted aryl, substituted or unsubstituted cycloalkyl, substituted or unsubstituted cycloalkenyl, or a fused ring of at least two of the above, and provided that when $R_2$ is aryl, then Y is O, COO, —CONH, or OCO;

k is an integer ranging from 1 to 5;

m is an integer of 1 or 2; and n is an integer of 1 or more.

2. The liquid crystal alignment agent of claim 1, comprising the epoxy compound in an amount of about 0.01 to about 60 parts by weight based on about 100 parts by weight of the polymer.

3. The liquid crystal alignment agent of claim 1, comprising the epoxy compound in an amount of about 0.5 to about 40 parts by weight based on about 100 parts by weight of the polymer.

4. The liquid crystal alignment agent of claim 1, wherein the epoxy compound comprises at least one compound represented by the following Chemical Formulae 12 to 14:

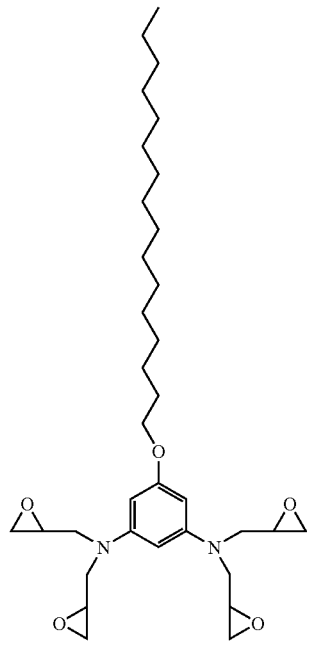

[Chemical Formula 12]

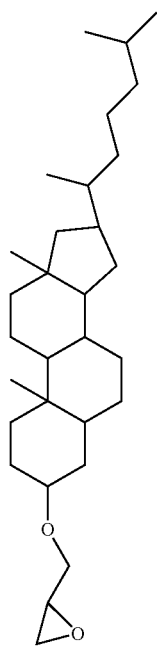

[Chemical Formula 13]

[Chemical Formula 14]

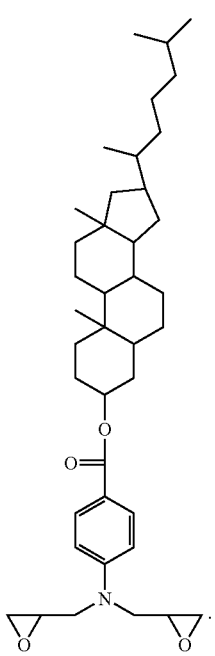

5. A liquid crystal alignment film fabricated by applying the liquid crystal alignment agent according to claim 1 to a substrate.

6. A liquid crystal display (LCD) comprising a liquid crystal alignment film according to claim 5.

7. The liquid crystal alignment agent of claim 1, wherein Z is O and n is 1.

8. The liquid crystal alignment agent of claim 1, wherein Z is N and Y is O or COO.

9. The liquid crystal alignment agent of claim 8, wherein Y is COO.

10. The liquid crystal alignment agent of claim 8, wherein at least one of $R_1$ and $R_2$ is substituted or unsubstituted cycloalkyl, substituted or unsubstituted cycloalkenyl, or a fused ring thereof.

\* \* \* \* \*